United States Patent Office 3,518,276
Patented June 30, 1970

3,518,276
SUBSTITUTED 1-BENZOYLPROPYL-4-HYDROXY-
4-PHENYL PIPERIDINE DERIVATIVES
Paul Adriaan Jan Janssen, Vosselaar, Belgium, assignor to Janssen Pharmaceutica, a corporation of Belgium
No Drawing. Filed Nov. 23, 1966, Ser. No. 596,396
Claims priority, application Great Britain, Dec. 8, 1965, 52,125/65; Sept. 23, 1966, 42,589/66
Int. Cl. C07d 29/20
U.S. Cl. 260—294.7    3 Claims

ABSTRACT OF THE DISCLOSURE

The compounds herein are of the class of 4-hydroxy butyrophenone piperidines useful for their central nervous system depressant activity.

---

This invention relates to novel piperidine derivatives, including the pharmaceutically acceptable salts thereof, and to methods for their preparation. More particularly, the compounds provided by the invention are piperidine derivatives which may be structurally represented by the following general formulas:

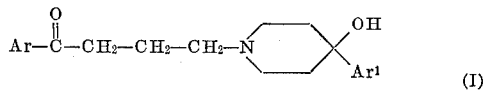

and

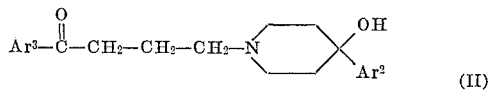

wherein, with respect to Formula I, Ar is a member selected from the group consisting of phenyl, halophenyl and lower alkoxy-phenyl, and $Ar^1$ is a member selected from the group consisting of di-halo-phenyl, tri-halo-phenyl, lower alkyl-halo-phenyl and trifluoromethyl-halo-phenyl; and, with respect to Formula II, $Ar^2$ is halophenyl and $Ar^3$ is a member selected from the group consisting of di-halo-phenyl and lower alkyl-halophenyl.

The preferred compounds provided by the invention are, with respect to Formula I, those in which Ar is halophenyl, more preferably 4-fluorophenyl, and $Ar^1$ is di-halophenyl, more preferably 3,4-dichlorophenyl, lower alkyl-halo-phenyl, more preferably 3-chloro-4-methylphenyl and 3-methyl-4-chloro-phenyl, and trifluoromethyl-halo-phenyl, more preferably 3-trifluoromethyl-4-chloro-phenyl; and, with respect to Formula II, those in which $Ar^2$ is halophenyl, more preferably 4-chlorophenyl, and $Ar^3$ is lower alkyl-halo-phenyl, more preferably 2-methyl-4-fluoro-phenyl.

As used herein, lower alkyl and lower alkoxy may be straight or branched-chain radicals which contain up to 6 carbon atoms, such as, for example, methyl, ethyl, propyl, isopropyl, secondary-butyl, pentyl, hexyl and the like, and, respectively, methoxy, ethoxy, propoxy, isopropoxy, etc.; and halo includes fluoro, bromo, chloro and iodo.

The organic bases of this invention form pharmaceutically useful non-toxic salts with a variety of inorganic and strong organic acids including sulfuric, phosphoric, hydrochloric, hydrobromic, hydroiodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluene sulfonate, ethylene chlorohydrin, propylene chlorohydrin, allyl bromide, methallyl bromide and crotyl bromide.

The novel compounds provided by this invention have useful pharmacological and pharmaceutical properties and applications in view of their central nervous system depressant activity. More specifically, the compounds are psychotropic and neuroleptic agents.

The compounds of this invention can be prepared by the condensation of an appropriately selected reactive ester of a compound of the formula:

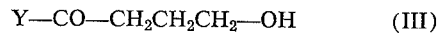

such as a halo compound of the formula:

wherein Y is an Ar or $Ar^3$ group as previously defined, with an appropriately selected compound of the formula:

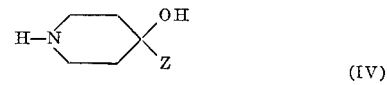

wherein Z is the previously defined $Ar^1$ or $Ar^2$ group, the choice of which naturally depends upon the previously selected Y group in (III). The condensation can be carried out in any suitable organic solvent such as, for example, an aromatic hydrocarbon, e.g., benzene, toluene, xylene and the like, a lower alkanol, e.g., ethanol, propanol, butanol and the like, and a lower alkanone, e.g., acetone, butanone, 4-methyl-2-pentanone and the like. Elevated temperatures may be advantageously employed to accelerate the rate of reaction.

To prepare the starting compounds of Formula IV, 1-R-4-piperidone (V), wherein R is benzyl or alkoxy carbonyl, is condensed with an appropriately substituted phenyllithium compound (VI). The adduct (VII) thus obtained is converted by treatment with water to the corresponding hydroxy compound (VIII). When R is benzyl, said compound (VIII), in either its base form or, if subsequently treated with a suitable inorganic or organic acid, its acid addition form (VIII–a), is then debenzylated, for example, by hydrogenation over palladium on charcoal, to give the desired starting compound (IV). When R is alkoxy carbonyl, the protecting group R is removed by heating compound (VIII) with a suitable alkali, e.g., potassium hydroxide, to give the desired compound (IV). The phenyllithium compound (VI) is advantageously obtained by treating an appropriately substituted phenyl halide with an alkyllithium. The reaction schemes may be illustrated as follows:

$$Z\text{-halogen} + \text{alkyl-Li} \rightarrow Z\text{-Li} \quad (VI)$$

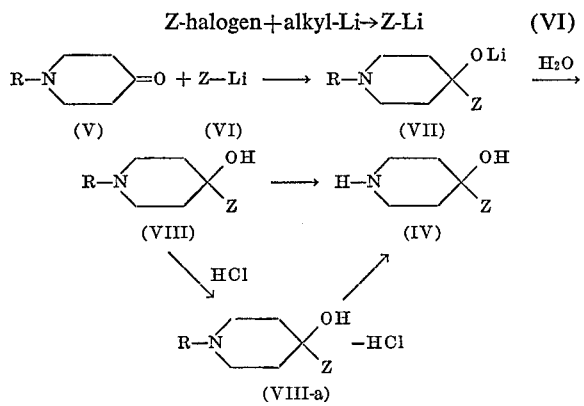

An alternative method of preparing the starting compounds (IV) is by the condensation of 1-R-4-piperidone (IX), wherein R is as above defined, e.g., 1-(ethoxy-carbonyl-4-piperidone, or 1-benzyl-4-piperidone, with an appropriately substituted phenylmagnesium halide (X) under Grignard conditions. When R is alkoxy-carbonyl, the protecting group R in the 1-position of the thus obtained 1-R-4-hydroxy-4-Z-piperidine (XI) is removed by heating the latter with a suitable alkali, e.g., potassium hydroxide, to give the desired starting compound (IV). When R is benzyl, compound (XI) is then debenzylated, for example, by hydrogenation over palladium-on-charcoal, to give the desired starting compound (IV). The foregoing reactions may be illustrated thusly:

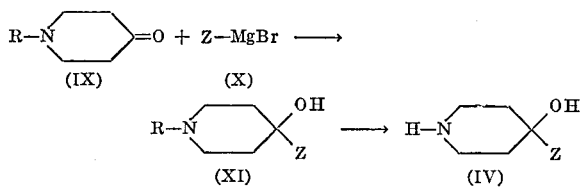

The subject compounds can also be prepared by reacting a reactive ester of a hydroxy alkanonitrile of the formula:

NC—CH$_2$CH$_2$CH$_2$—OH such as a halo compound of the formula:

NC—CH$_2$CH$_2$CH$_2$-halogen with a 4-hydroxy-4-Z-piperidine of Formula IV above, wherein Z is the previously defined Ar$^1$ or Ar$^2$ group. The 1-(3-cyano-propyl)-4-hydroxy-4-Z-piperidine of the formula:

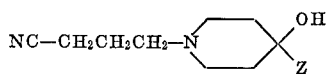

thus obtained is heated with an appropriately substituted phenylmagnesium halide of the formula:

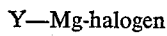

Y—Mg-halogen under Grignard conditions, said Y being an appropriately selected Ar or Ar$^3$ group as defined heretofore, the choice of which naturally depends upon the previously selected Z group in (IV).

The compounds which constitute this invention and the methods for their preparation will appear more fully from a consideration of the following examples, which are given for the purpose of illustration only and are not to be construed as limiting the invention in spirit or in scope. In these examples quantities are indicated as parts by weight, unless otherwise specified.

EXAMPLE I

A mixture of 75.5 parts 4-chloro-butyronitrile, 140 parts 4-hydroxy-4-(4-chloro-phenyl)-piperidine, 106 parts sodium carbonate, 1 part potassium iodide in 1600 parts 4-methyl-2-pentanone is stirred and refluxed for three days. After cooling there are added 1000 parts water. The organc layer is separated, dried over magnesium sulfate, filtered and evaporated. The oily residue is dissolved in ether. On treating the ethereal solution with aqueous hydrochloric acid, a solid is precipitated, which is filtered off and dissolved in water. The aqueous solution is alkalized with sodium hydroxide and extracted with chloroform. The extract is dried over magnesium sulfate, filtered and evaporated. The solid residue is recrystallized from a mixture of 480 parts benzene and 160 parts petroleum ether, yielding 1-(3-cyano-propyl)-4-hydroxy-4-(4-chloro-phenyl)-piperidine; M.P. 90–91° C.

To a solution of 3,4-difluorophenylmagnesium bromide, prepared in the usual manner starting from 25 parts of 3,4-difluoro-bromobenzene and 2.99 parts of magnesium in 80 parts of anhydrous ether, is added dropwise a solution of 11.9 parts of 1-(3-cyano-propyl)-4-hydroxy-4-(4-chloro-phenyl)-piperidine in 560 parts of anhydrous ether (exothermic reaction). After the addition is complete, the whole is stirred and refluxed for 8 hours. The reaction mixture is cooled in an ice-bath and treated with a solution of 8 parts of ammonium chloride in 25 parts of water. The ether is evaporated. The residue is refluxed for 3 hours in 400 parts of water. After cooling, the mixture is extracted with chloroform. The extract is dried over magnesium sulfate, filtered and evaporated. The solid residue is recrystallized twice from a mixture of benzene and petroleum ether and further from 2-propanol, yielding 1-[3-(3,4-difluoro-benzoyl)-propyl] - 4 - hydroxy-4-(4-chloro-phenyl)-piperidine; M.P. 132.5–137° C.

EXAMPLE II

To a solution of 3-chloro-4-methyl-phenyl magnesium-bromide, prepared in the usual manner starting from 17 parts of magnesium and 147 parts of 2-chloro-4-bromo-toluene in 270 parts of tetrahydrofuran, is added dropwise a solution of 85 parts of 1-(ethoxy-carbonyl)-4-oxo-piperidine in 630 parts of tetrahydrofuran at reflux temperature. After the addition is complete, the whole is further stirred and refluxed for 6 hours. After cooling, the reaction mixture is treated with successive additions of crushed ice and glacial acetic acid. The organic layer is separated, washed twice with potassium carbonate solution, dried, filtered and evaporated. The oily residue slowly solidifies on stirring in petroleum ether. The solid is filtered off and recrystallized twice from a mixture of toluene and petroleum ether, yielding 1-(ethoxy-carbonyl)-4-hydroxy-4-(3-chloro-4-methyl - phenyl)-piperidine; M.P. 134.5–138° C.

A mixture of 100 parts of 1-(ethoxy-carbonyl)-4-hydroxy-4-(3-chloro-4-methyl-phenyl)-piperidine, 40 parts of potassium hydroxide and 320 parts of 2-propanol is stirred and refluxed for 72 hours. After cooling, there is added 200 parts water while stirring. The solvent is evaporated. The residue is extracted with chloroform. The extract is dried, filtered and evaporated. The residue is dissolved in ether and gaseous hydrogen chloride is introduced into the solution. The precipitated solid is filtered off and recrystallized from acetone, yielding 4-hydroxy-4 - (3-chloro-4-methyl-phenyl)-piperidine hydrochloride; M.P. 168.5–169.5° C. Neutralization of the salt with alkali such as sodium hydroxide affords the corresponding free base.

EXAMPLE III

A mixture of 4.4 parts of 4-chloro-4'-fluorobutyrophenone, 4.4 parts of 4-hydroxy-4-(3-chloro-4-methyl-phenyl)-piperidine, 5.3 parts of sodium carbonate, a few crystals of potassium iodide, in 240 parts of 4-methyl-2-pentanone is stirred and refluxed for 24 hours. Then a second portion of 4.4 parts of 4-chloro-4'-fluorobutyrophenone is added and the whole is stirred and refluxed for an additional 36 hours. After cooling, there is added 200 parts of water. The organic layer is separated, dried over magnesium sulfate, filtered and evaporated. The oily residue is dissolved in 240 parts of ether. The solution is filtered and gaseous hydrogen chloride is introduced into the filtrate. The precipitated solid is filtered off and recrystallized from a mixture of methanol and ether, yielding 1-[3-(4-fluoro-benzoyl)-propyl] - 4 - hydroxy-4-(3-chloro-4-methyl-phenyl)-piperidine hydrochloride; M.P. 203–205° C.

EXAMPLE IV

A mixture of 6.1 parts of γ-chloro-4-methoxy-butyrophenone, 4.4 parts of 4-hydroxy-4-(3-chloro-4-methyl-phenyl)-piperidine, 3.2 parts of sodium carbonate, a few crystals of potassium iodide in 200 parts of 4-methyl-2-pentanone is stirred and refluxed for 60 hours. After cooling, there is added 200 parts of water. The organic layer is separated, dried over potassium carbonate, filtered and evaporated. The semi-solid residue is dissolved in ether. The solution is filtered and gaseous hydrogen chloride is introduced into the filtrate. The precipitated solid is filtered off and recrystallized from a mixture of methanol and ether, yielding 1-[3-(4-methoxy-benzoyl)-propyl] - 4 - hydroxy-4-(3-chloro-4-methyl-phenyl)-piperidine hydrochloride; M.P. 219.5–225° C.

EXAMPLE V

A mixture of 4 parts of 4-chloro-butyrophenone, 4.4 parts of 4-hydroxy-4-(3-chloro-4-methyl-phenyl)-piperidine, 3.2 parts of sodium carbonate, a few crystals of potassium iodide in 200 parts of 4-methyl-2-pentanone is stirred and refluxed for 60 hours. After cooling, there is added 200 parts of water. The organic layer is separated, dried over potassium carbonate, filtered and evaporated. The oily residue is dissolved in 400 parts of ether. This solution is filtered and gaseous hydrogen chloride is introduced into the filtrate. The precipitated salt is filtered off and recrystallized from a mixture of methanol and ether, yielding 1-(3-benzoyl-propyl)-4-hydroxy-4-(3-chloro-4-methyl - phenyl) - piperidine hydrochloride; M.P. 202.5–204° C.

EXAMPLE VI

To a stirred and refluxing solution of 3,4-dichlorophenyl magnesiumbromide, prepared in the usual manner starting from 24 parts of magnesium and 226 parts of 3,4-dichloro-bromobenzene in 540 parts of anhydrous tetrahydrofuran is added dropwise a solution of 130 parts of 1-(ethoxy-carbonyl)-4-oxo-piperidine in 540 parts of anhydrous tetrahydrofuran. After the addition is complete, the whole is further stirred and refluxed for 6 hours. The reaction mixture is cooled and treated with glacial acetic acid and crushed ice. The aqueous layer is separated and extracted once more with ether. The combined organic layers are dried, filtered and evaporated. The oily residue solidifies on standing at room temperature. The solid product is filtered off and recrystallized from a mixture of toluene and petroleumether, yielding 1-(ethoxy-carbonyl)-4-hydroxy-4-(3,4-dichloro-phenyl)-piperidine; M.P. 135–139.5° C.

A mixture of 150 parts of 1-(ethoxy-carbonyl)-4-hydroxy-4-(3,4-dichloro-phenyl)-piperidine, 80 parts of potassium hydroxide, 640 parts of 2-propanol and 20 parts of water is stirred and refluxed for 72 hours. After cooling, there is added 150 parts of water. The whole is evaporated. The solid residue is extracted with chloroform. The extract is dried, filtered and evaporated. The solid residue is recrystallized from a mixture of ethanol and water, to yield 4-hydroxy-4-(3,4-dichloro-phenyl)-piperidine; M.P. 136–143° C.

EXAMPLE VII

A mixture of 4.4 parts of γ-chloro-4-fluoro-butyrophenone, 5 parts of 4-hydroxy-4-(3,4-dichloro-phenyl)-piperidine, 3.2 parts of sodium carbonate, a few crystals of potassium iodide in 200 parts of 4-methyl-2-pentanone is stirred and refluxed for 24 hours. Then a second portion of 4.4 parts of γ-chloro-4-fluoro-butyrophenone is added and the whole is further stirred and refluxed for 48 hours. After cooling, there is added 150 parts of water. The organic layer is separated, dried, filtered and evaporated. The solid residue is recrystallized twice: first from diisopropylether and then from 2-propanol, to yield 1-[3-(4-fluoro-benzoyl)-propyl]-4-hydroxy-4-(3,4-dichloro - phenyl)-piperidine; M.P. 132.5–136° C.

EXAMPLE VIII

A mixture of 4 parts of γ-chloro-butyrophenone, 5 parts of 4-hydroxy-4-(3,4-dichloro-phenyl)-piperidine, 3.2 parts of sodium carbonate, a few crystals of potassium iodide in 200 parts of 4-methyl-2-pentanone is stirred and refluxed for 72 hours. After cooling, there is added 100 parts of water. The organic layer is separated, dried, filtered and evaporated. The solid residue is recrystallized from a mixture of ethanol and water, yielding 1-(3-benzoyl-propyl)-4-hydroxy - 4 - (3,4 - dichloro-phenyl)-piperidine; M.P. 148–149° C.

EXAMPLE IX

To a stirred and refluxing solution of 3-methyl-4-chloro-phenyl magnesiumbromide, prepared in the usual manner, starting from 24 parts of magnesium and 205 parts of 3-methyl-4-chloro-bromobenzene in 850 parts of tetrahydrofuran, is added dropwise a solution of 130 parts of 1-(ethoxy-carbonyl)-4-oxo-piperidine in 600 parts of tetrahydrofuran (exothermic reaction). After the addition is complete, the whole is further stirred and refluxed for 6 hours. After cooling, the reaction mixture is treated with successive additions of glacial acetic acid, water and crushed ice. The organic layer is separated, dried, filtered and evaporated. The oily residue crystallizes on treating with diisopropylether. The solid product is filtered off and dried, yielding 1-(ethoxy-carbonyl)-4-hydroxy-4-(3-methyl-4-chloro-phenyl)-piperidine; M.P. 128–133.5° C.

A mixture of 137 parts of 1-(ethoxy-carbonyl)-4-hydroxy-4-(3-methyl-4-chloro-phenyl)-piperidine, 80 parts of potassium hydroxide, 20 parts of water and 640 parts of 2-propanol is stirred and refluxed for 72 hours. After cooling, there is added 100 parts of water. The precipitated material is filtered off and the filtrate is concentrated for 90% of its volume. The residue is extracted with chloroform. The extract is dried, filtered and evaporated. The residue is recrystallized from diisopropylether, to yield 4-hydroxy-4-(3 - methyl-4-chloro-phenyl) - piperidine; M.P. 117–118.5° C.

EXAMPLE X

A mixture of 4.6 parts of γ-chloro-4-methoxy-butyrophenone, 4.4 parts of 4-hydroxy-4-(3-methyl-4-chloro-phenyl)-piperidine, 3.2 parts of sodium carbonate, a few crystals of potassium iodide in 200 parts of 4-methyl-2-pentanone is stirred and refluxed for 72 hours. After cooling, there is added 150 parts of water. The organic layer is separated, dried, filtered and evaporated. The solid residue is stirred in diisopropylether, filtered off again and recrystallized from a mixture of ethanol and water, to yield 1-[3-(4-methoxy - benzoyl)-propyl]-4-hydroxy-4-(3-methyl-4-chloro-phenyl)-piperidine; M.P. 137–137.5° C.

EXAMPLE XI

A mixture of 4.4 parts of γ-chloro-4-fluorobutyrophenone, 4.4 parts of 4-hydroxy-4-(3-methyl-4-chloro-phenyl)-piperidine, 3.2 parts of sodium carbonate, a few crystals of potassium iodide in 200 parts of 4-methyl-2-pentanone is stirred and refluxed for 72 hours. After cooling, there is added 150 parts of water. The organic layer is separated, dried, filtered and evaporated. The oily residue is crystallized from diisopropylether. The solid product is filtered off and recrystallized from a mixture of ethanol and water, yielding 1-[3-(4-fluorobenzoyl)-propyl]-4-hydroxy-4-(3-methyl-4-chloro-phenyl)-piperidine; M.P. 123–124° C.

EXAMPLE XII

A mixture of 4 parts of γ-chloro-butyrophenone, 4,4 parts of 4 - hydroxy-4-(3-methyl-4-chloro-phenyl)piperidine 3.2 parts of sodium carbonate, a few crystals of potassium iodide in 200 parts 4-methyl-2-pentanone is stirred and refluxed for 72 hours. After cooling, there is added 150 parts of water. The organic layer is separated, dried, filtered and evaporated. The solid residue is stirred in diisopropylether, filtered off again and recrystallized from a mixture of ethanol and water, yielding 1-(3-benzoyl-propyl) - 4 - hydroxy - 4-(3-methyl-4-chloro-phenyl)-piperidine; M.P. 141–142° C.

EXAMPLE XIII

To a stirred and refluxing solution of 3-trifluoromethyl-4 - chloro - phenyl magnesiumbromide, prepared in the usual manner starting from 18 parts of magnesium and 203 parts of 3 - trifluoro - methyl - 4-chloro-bromobenzene in 450 parts of tetrahydrofuran, is added dropwise a solution of 83 parts of 1 - (ethoxy-carbonyl)-4-oxo-piperidine in 450 parts of tetrahydrofuran (exothermic reaction). After the addition is complete, the whole is further stirred and refluxed for another 6 hours. After keeping overnight, the reaction mixture is treated with crushed ice and glacial acetic acid. Then there is added 250 parts of water. The organic layer is separated, dried, filtered and evaporated. The oily residue is dissolved in 1200 parts of diisopropylether. This solution is filtered. The filtrate is washed successively with diluted potassium hydroxide solution and water, dried over magnesium sulfate, filtered and evaporated. On standing the oily residue at room temperature, the product solidifies. It is filtered off, stirred in a mixture of benzene and petroleumether, filtered off again and dried, yielding 1-(ethoxy-carbonyl) - 4 - hydroxy - 4-(3-trifluoro-methyl-4-chloro-phenyl)-piperidine; M.P. 114–116° C.

A mixture of 35 parts of 1 - (ethoxy - carbonyl)-4-hydroxy - 4 - (3 - trifluoromethyl-4-chloro-phenyl)-piperidine, 20 parts of potassium hydroxide, 160 parts of 2-propanol and 5 parts of water is stirred and refluxed for 72 hours. After cooling, there is added 250 parts of water. The whole is filtered and the filtrate is evaporated. The oily residue is extracted with chloroform. The extract is filtered and evaporated. To the residue is added diisopropylether and on standing the product is precipitated, yielding 4 - hydroxy - 4 - (3-trifluoromethyl-4-chloro-phenyl)-piperidine; M.P. 134–135.5° C.

A mixture of 4 parts of γ-chloro-4-fluorobutyrophenone, 4.5 parts of 4 - hydroxy - 4 - (3-trifluoromethyl-4-chloro-phenyl)-piperidine, 3.2 parts of sodium carbonate, a few crystals of potassium iodide in 200 parts of 4-methyl-2-pentanone is stirred and refluxed for 72 hours. After cooling, there is added 50 parts of water. The organic layer is separated, filtered and evaporated. The oily residue is dissolved in diisopropylether and gaseous hydrogen chloride is introduced into the solution. The precipitated product is filtered off and recrystallized from a mixture of ethanol and ether, yielding 1-[3-(4-fluorobenzoyl)-propyl] - 4 - hydroxy - 4-(3-trifluoromethyl-4-chloro-phenyl)-piperidine hydrochloride; M.P. 203.5–206° C.

EXAMPLE XIV 34 parts of sodium nitrite is dissolved in 430 parts of concentrated sulfuric acid while stirring vigorously and cooling in an ice-bath. To this solution is added a solution of 82 parts of 3,4,5-trichloro-aniline in 990 parts of glacial acetic acid at such a rate that the temperature is kept at or below 20° C. Then the whole is added to a solution of 70 parts of cuprous bromide in 1050 parts of hydrobromic acid solution 48% and the mixture is stirred for 30 minutes longer. The reaction mixture is filtered. The residue on the filter is washed successively twice with hydrobromic acid solution 48% and then three times with water. It is dissolved in ether. The solution is washed with water, boiled with activated charcoal, filtered, dried, filtered again and evaporated. The oily residue solidifies on cooling. It is filtered off and recrystallized from 80 parts of diisopropylether, yielding 3,4,5-trichloro-bromobenzene; M.P. 57.5–59.5° C.

A solution of 3,4,5-trichlorophenyl magnesiumbromide is prepared in the usual manner, starting from 7.5 parts of magnesium and 80 parts of 3,4,5-trichloro-bromobenzene in 180 parts of tetrahydrofuran. To this stirred and refluxing solution is added dropwise a solution of 46 parts of 1 - (ethoxy - carbonyl) - 4-oxo-piperidine in 380 parts of tetrahydrofuran and the whole is further stirred and refluxed for 6 hours. The reaction mixture is cooled and treated with glacial acetic acid and crushed ice. The organic phase is separated, dried, filtered and evaporated. The residue is stirred in 2-propanol, filtered off and dried, yielding 1 - (ethoxy-carbonyl)-4-hydroxy-4-(3,4,5-trichloro-phenyl)-piperidine; M.P. 173–177° C.

A mixture of 8 parts of 1 - (ethoxy-carbonyl)-4-hydroxy - 4 - (3,4,5 - trichloro-phenyl)-piperidine, 10 parts of potassium hydroxide, 80 parts of 2-propanol and 1 part of water is stirred and refluxed for 72 hours. After cooling, there is added 100 parts of water. The reaction mixture is stirred for a while, filtered and evaporated. The semi-solid residue is extracted with chloroform. The extract is dried, filtered and evaporated. The solid residue is recrystallized from a mixture of 2-propanol and water, yielding 4 - hydroxy - 4 - (3,4,5-trichloro-phenyl)-piperidine; M.P. 206–209° C.

A mixture of 3.3 parts of 4 - chloro - 4' - fluorobutyrophenone, 3.2 parts of 4 - hydroxy - 4 - (3,4,5-trichloro-phenyl)-piperidine, 2.1 parts of sodium carbonate, a few crystals of potassium iodide in 200 parts of 4-methyl-2-pentanone is stirred and refluxed for 36 hours. After cooling, there is added 50 parts of water. The organic layer is separated, dried, filtered and evaporated. The oily residue is dissolved in diisopropylether. This solution is filtered and gaseous hydrogen chloride is introduced into the filtrate. The precipitated solid salt is filtered off and recrystallized from a mixture of ethanol and ether, yielding 1 - [3 - (4 - fluoro-benzoyl)-propyl]-4-hydroxy-4-(3,4,5-trichloro - phenyl)piperidine hydrochloride; M.P. 214–217° C.

EXAMPLE XV

A mixture of 6.3 parts 4-chloro-2'-methyl-4'-fluoro-butyrophenone, 5 parts 4-hydroxy-4-(4-chloro-phenyl)-piperidine, 10.6 parts sodium carbonate, a few crystals of potassium iodide in 160 parts 4-methyl-2-pentanone is stirred and refluxed for 2.5 days. After cooling, the reaction mixture is filtered and the filtrate is evaporated. The residue is dissolved in a mixture of 320 parts anh. ether and 80 parts acetone and HCl gas is introduced into the solution. The whole is evaporated in vacuo. The residue is triturated in boiling acetone and after cooling to −15° C., 2.8 parts crude product are filtered off. This crop is recrystallized from isopropanol. After cooling at −15° C., 1-[3-(2-methyl-4-fluoro-benzoyl)-propyl]-4-hydroxy-4-(4-chlorophenyl)-piperidine hydrochloride is obtained; M.P. 194–196.4° C.; white shiny scales.

What is claimed is:

1. A member selected from the group consisting of a chemical compound of the formula:

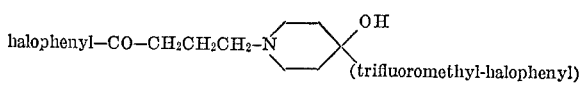

and the pharmaceutically acceptable acid addition and quaternary ammonium salts thereof.

2. A compound selected from the group consisting of 1-[3-(4 - fluoro-benzoyl)-propyl] - 4 - hydroxy-4-(3-tri-fluoromethyl-4-chloro-phenyl)-piperidine and the pharmaceutically acceptable acid addition salts thereof.

3. A member selected from the group consisting of a chemical compound of the general formula:

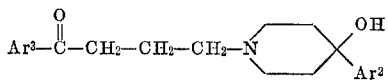

in which formula Ar² is halophenyl; and Ar³ is di-halophenyl; and pharmaceutically acceptable acid addition and quaternary ammonium salts thereof.

References Cited

UNITED STATES PATENTS 3,097,209  7/1963  Janssen _____ 260—294.7

FOREIGN PATENTS 632,437  12/1961  Canada.
963,639  7/1964  Great Britain.

OTHER REFERENCES

Chemical Abstracts, vol. 61, p. 8282f, by Beckett et al., September 1964.

Chemical Abstracts, vol. 60, p. 6075d, by Janssen, March 1964.

HENRY R. JILES, Primary Examiner

S. D. WINTERS, Assistant Examiner

U.S. Cl. X.R.

260—294, 293.4, 999, 592, 294.3, 465.6, 465